US011321928B2

(12) United States Patent
Melkote Krishnaprasad et al.

(10) Patent No.: US 11,321,928 B2
(45) Date of Patent: May 3, 2022

(54) METHODS AND APPARATUS FOR ATLAS MANAGEMENT OF AUGMENTED REALITY CONTENT

(71) Applicant: QUALCOMM Incorporated, San Diego, CA (US)

(72) Inventors: Vinay Melkote Krishnaprasad, Bangalore (IN); Sandeep Kanakapura Lakshmikantha, Bangalore (IN); Sudipto Banerjee, Bangalore (IN); Sagar Ravindra Kalbande, Bengaluru (IN); Soumyajit Bijankumar Deb, Bangalore (IN); Arjun Sitaram, Bengaluru (IN); Ajit Venkat Rao, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/039,834

(22) Filed: Sep. 30, 2020

(65) Prior Publication Data

US 2021/0358219 A1     Nov. 18, 2021

(30) Foreign Application Priority Data

May 14, 2020    (IN) .............................. 202041020333

(51) Int. Cl.
*G09G 5/00*     (2006.01)
*G06T 19/00*    (2011.01)
(Continued)

(52) U.S. Cl.
CPC .............. *G06T 19/006* (2013.01); *G06T 1/20* (2013.01); *G06T 7/20* (2013.01); *G06T 15/005* (2013.01); *G06T 2210/12* (2013.01)

(58) Field of Classification Search
CPC ....... G06T 19/006; G06T 19/00; G06F 3/011; G06F 3/012; G02B 27/017
(Continued)

(56) References Cited

U.S. PATENT DOCUMENTS 10,580,200 B2    3/2020  Insko et al.
2018/0329465 A1  11/2018 Tavakoli et al.
(Continued)

FOREIGN PATENT DOCUMENTS

WO    2020060279 A1    3/2020

OTHER PUBLICATIONS

International Search Report and Written Opinion—PCT/US2021/027137—ISA/EPO—dated Jul. 30, 2021.
(Continued)

*Primary Examiner* — Gordon G Liu
(74) *Attorney, Agent, or Firm* — Campbell C. Chiang; Arent Fox LLP

(57) ABSTRACT

The present disclosure relates to methods and apparatus for graphics processing. The apparatus can determine an eye-buffer including one or more bounding boxes associated with rendered content in a frame. The apparatus can also generate an atlas based on the eye-buffer, the atlas including one or more patches associated with the one or more bounding boxes. Additionally, the apparatus can communicate the atlas including the one or more patches. The apparatus can also calculate an amount of user motion associated with the rendered content in the frame. Further, the apparatus can determine a size of each of the one or more bounding boxes based on the calculated amount of user motion. The apparatus can also determine a size and location of each of the one or more patches in the atlas.

30 Claims, 8 Drawing Sheets

(51) Int. Cl.
*G06T 15/00* (2011.01)
*G06T 7/20* (2017.01)
*G06T 1/20* (2006.01)

(58) Field of Classification Search
USPC ........................................................ 345/633
See application file for complete search history.

(56) References Cited

U.S. PATENT DOCUMENTS

2018/0350036 A1* 12/2018 VanReenen ............. G06F 3/013
2019/0073553 A1    3/2019 Yao et al.
2019/0371051 A1* 12/2019 Dore ......................... G06T 7/90
2020/0314435 A1* 10/2020 Tourapis .................... G06T 7/74
2021/0037250 A1*  2/2021 Makar .................. H04N 19/166

OTHER PUBLICATIONS

Joerg M.H., et al., "Shading Atlas Streaming Demonstration", 2018 IEEE International Symposium on Mixed and Augmented Reality Adjunct (ISMAR-ADJUNCT), IEEE, Oct. 16, 2018 (Oct. 16, 2018), pp. 425-426, XP033542838, DOI: 10.1109/ISMAR-ADJUNCT.2018.00128 [Retrieved on Apr. 25, 2019] the whole document.

"V-PCC Future Enhancements (V3C + V-PCC)", 130. MPEG Meeting, Apr. 20, 2020-Apr. 24, 2020, Alpbach, Information technology—Coded Representation of Immersive Media—Part 5: Visual Volumetric Video-based Coding (V3C) and Video-based Point Cloud Compression (V-PCC), (Motion Picture Expert Group or ISO/IEC JTC1/SC29/WG11), No. N19329, May 9, 2020 (May 9, 2020), XP030285587, 246 Pages, Retrieved from the Internet: URL: http://phenix.int-evry.fr/mpeg/doc_end_user/documents/130_Alpbach/wg11/w19329. zip. w19329_V-PCC_DIS_d85_clean.docx. [Retrieved on May 9, 2020] the whole document.

"V-PCC Future Enhancements (V3C + V-PCC)", 130. MPEG Meeting, Apr. 20, 2020-apr. 24, 2020, Alpbach, (Motion Picture Expert Group or ISO/IEC JTC1/SC29/WG11), No. N19329, May 9, 2020 (May 9, 2020), XP030285587, 69 Pages, Retrieved from the Internet: URL: http://phenix.int-evry.fr/mpeg/doc_end_user/documents/130_Alpbach/wg11/w19329.zip. w19329_V-PCC_DIS_d85_clean.docx. [Retrieved on May 9, 2020] the whole document.

* cited by examiner

METHODS AND APPARATUS FOR ATLAS MANAGEMENT OF AUGMENTED REALITY CONTENT

CROSS REFERENCE TO RELATED APPLICATIONS

The present application claims priority to Indian Patent Application No. 202041020333, filed May 14, 2020, the entire contents of which are hereby incorporated by reference.

TECHNICAL FIELD

The present disclosure relates generally to processing systems and, more particularly, to one or more techniques for graphics or computer processing.

INTRODUCTION

Computing devices often utilize a graphics processing unit (GPU) or central processing unit (CPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A CPU may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a CPU or GPU of a device is configured to perform the processes in computer or graphics processing. However, with the advent of wireless communication and smaller, handheld devices, there has developed an increased need for improved computer or graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a client device, a central processing unit (CPU), a graphics processing unit (GPU), or any apparatus that can perform graphics or computer processing. The apparatus can generate the rendered content in the frame. The apparatus can receive an atlas that includes one or more patches associated with one or more bounding boxes that define sparse AR content of a frame; determine a location of each of the one or more patches for the sparse AR content in the received atlas; determine an eye-buffer that includes the one or more bounding boxes associated with the sparse AR content in the frame based on the determined location of each of the one or more patches; and render the AR content based on the eye-buffer to include the sparse AR content. In addition, the size of each of the one or more bounding boxes is defined based on the calculated amount of user motion associated with the rendered AR content in the frame. The apparatus can also determine a size of each of the one or more patches in the atlas that corresponds to a size of each of the one or more bounding boxes. The apparatus can also determine the location of each of the one or more patches for the sparse AR content in the received atlas based on patch metadata received from a server that generates the atlas. The apparatus can also receive warping metadata associated with the one or more patches in the atlas and to render the AR content based on the warping metadata. The apparatus can also transmit, to a server, at least one head pose sample of a user of the client device that indicates at least one a positioning and movement of the user; and receive, from the server, the atlas that includes the one or more patches associated with the one or more bounding boxes that each have a respective size that is defined based on the at least one head pose sample of the user. Yet further, the apparatus can also determine a patch correspondence between the frame and a previous frame of the AR content; conceal at least one patch of the received atlas based on the determined patch correspondence; and render the AR content based on the eye-buffer to include the sparse AR content to include the concealed at least one patch. Moreover, the apparatus can also include a decoder configured to receive the atlas in a compressed format and decode the atlas to determine the one or more patches associated with one or more bounding boxes that define sparse AR content of the frame.

Moreover, in an aspect of the disclosure, a method, a computer-readable medium, and an apparatus are provided. The apparatus may be a server, a central processing unit (CPU), a graphics processing unit (GPU), or any apparatus that can perform graphics or computer processing. The apparatus can determine an eye-buffer that includes one or more bounding boxes associated with sparse AR content in a frame; generate an atlas that includes the one or more bounding boxes associated with the sparse AR content in the frame; determine a location of one or more patches for the sparse AR content in the atlas that corresponds to the one or more bounding boxes; and transmit the atlas to a client device for rendering the AR content thereon based on the determined location of the one or more patches of the sparse AR content of the frame. Moreover, the apparatus can determine a size of each of the one or more patches in the atlas that corresponds to a size of each of the one or more bounding boxes. The apparatus can also determine the size of each of the one or more patches based on a target-bit rate for transmitting the atlas to the client device. The apparatus can also determine an amount of user motion associated with the rendered AR content in the frame; and determine a size of each of the one or more bounding boxes based on the calculated amount of user motion. The apparatus can also generate warping metadata associated with the one or more patches in the atlas, such that the client device is configured to render the AR content based on the warping metadata. The apparatus can also receive, from the client device, at least one head pose sample of a user of the client device that indicates at least one of a positioning and movement of the user; and determine, based on the at least one head pose sample of the user, a respective size of the one or more bounding boxes associated with the one or more patches of the atlas. The apparatus can also include an encoder that can encode the atlas in a compressed format, and transmit the encoded atlas to the client device The details of one or more examples of the disclosure are set forth in the accompanying drawings and the description

DETAILED DESCRIPTION

Figure 1:
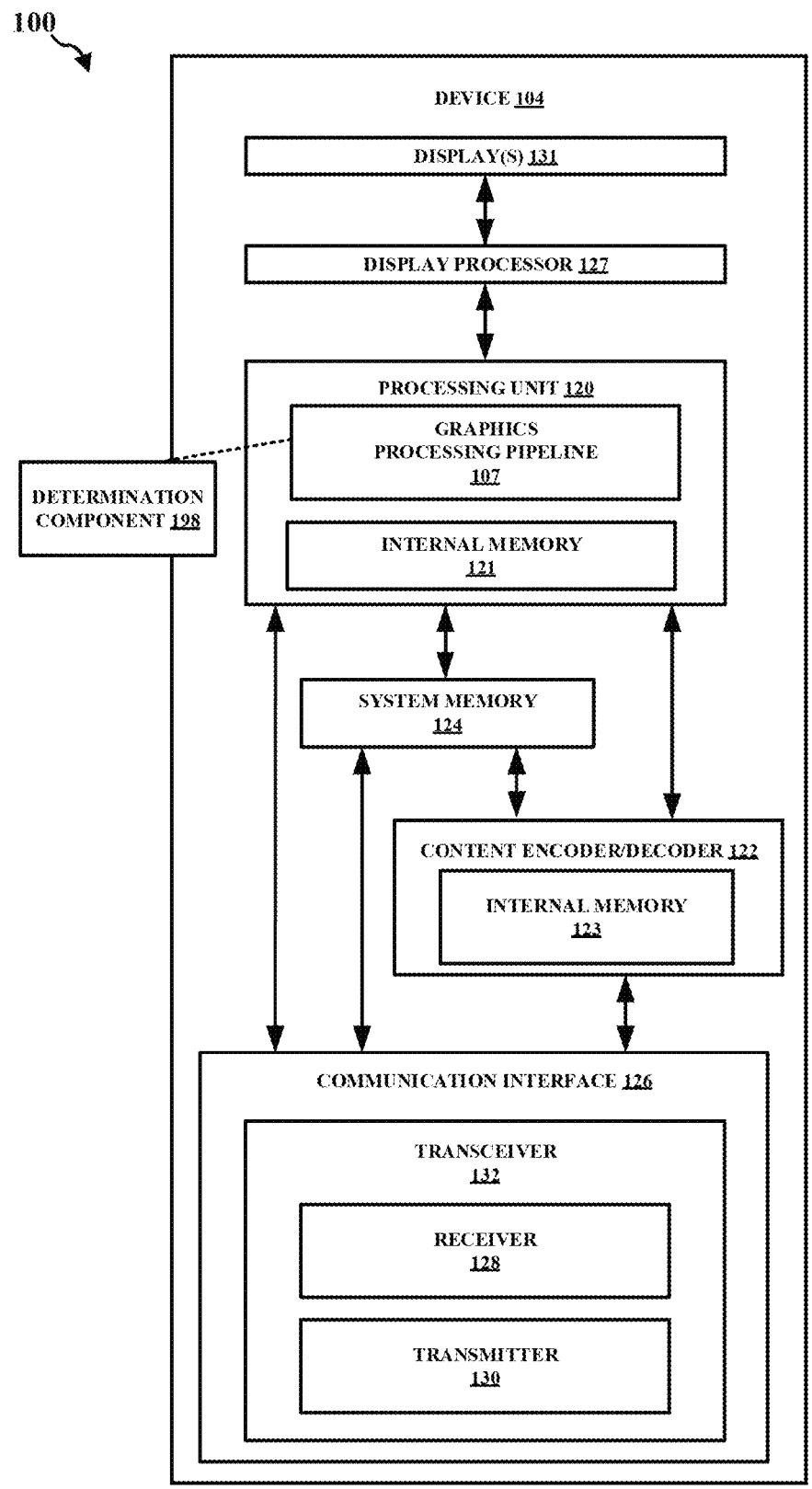
FIG. 1 is a block diagram that illustrates an example content generation system in accordance with one or more techniques of this disclosure.

In general, content rendered for augmented reality (AR) may be sparse given that the virtual content may be viewed in the context of the real world. In some aspects of AR, a portion of a frame, e.g., up to 50% or more, outside one or more bounding boxes of the rendered field of view may be transparent through which the real world is viewed. In some AR use cases, the rendering may be split between a server, e.g., a phone or edge server, and a client AR device, e.g., a head set. These devices can be connected by a wire or a wireless connection. In some instances, content may be rendered on the server, and then encoded and transmitted to the client device. The client device can then decode the content and warp it to the latest user pose, as well as display the content. Encoding and decoding an eye-buffer that corresponds to a full display resolution, e.g., including the transparent area, may result in significant latency and power without commensurate output. Accordingly, exemplary aspects of the present disclosure can include atlases and eye-buffers in split rendering that correspond to a full display resolution that result in an optimized amount of latency and power utilized. As discussed in detail below, the exemplary methods, apparatuses and systems of the present disclosure can include atlas management. For instance, atlas management can compact sparse AR content and reduce decode latency, as well as reduce the amount of power utilized. Moreover, aspects of the present disclosure can also reduce the amount of double data rate (DDR) bandwidth on the client side.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements described below with respect to the exemplary aspects may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays and in certain aspects may be configured to display augmented reality content as discussed below. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing according to the exemplary techniques for compression and rendering of AR content as described herein. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content encoding/decoding of digital content. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to generate the rendered content in the frame. The determination component 198 can also be configured to determine an eye-buffer including one or more bounding boxes associated with rendered content in a frame according to the exemplary aspects described below. The determination component 198 can also be configured to calculate an amount of user motion associated with the rendered content in the frame. The determination component 198 can also be configured to determine a size of each of the one or more bounding boxes based on the calculated amount of user motion. The determination component 198 can also be configured as an atlas manager to generate an atlas based on the eye-buffer, where the atlas can include one or more patches associated with the one or more bounding boxes. The determination component 198 can also be configured to determine a size and location of each of the one or more patches in the atlas. The determination component 198 can also be configured to encode the atlas including the one or more patches. The determination component 198 can also be configured to communicate the atlas including the one or more patches to a client device, for example. More particularly, the determination component 198 can also be configured to send, to a client device, the atlas including the one or more patches. The determination component 198 can also be configured to receive, from a server, the atlas including the one or more patches. The determination component 198 can also be configured to decode the atlas including the one or more patches and to warp the one or more patches in the decoded atlas based on one or more bounding boxes in a client eye-buffer. The determination component 198 can also be configured to determine a client eye-buffer including one or more bounding boxes based on the atlas including the one or more patches. The determination component 198 can also be configured to display the one or more bounding boxes in the client eye-buffer at a display, where the one or more bounding boxes may be associated with the rendered content in the frame.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component, e.g., a GPU, but, in further embodiments, can be performed using other components, e.g., a CPU, consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
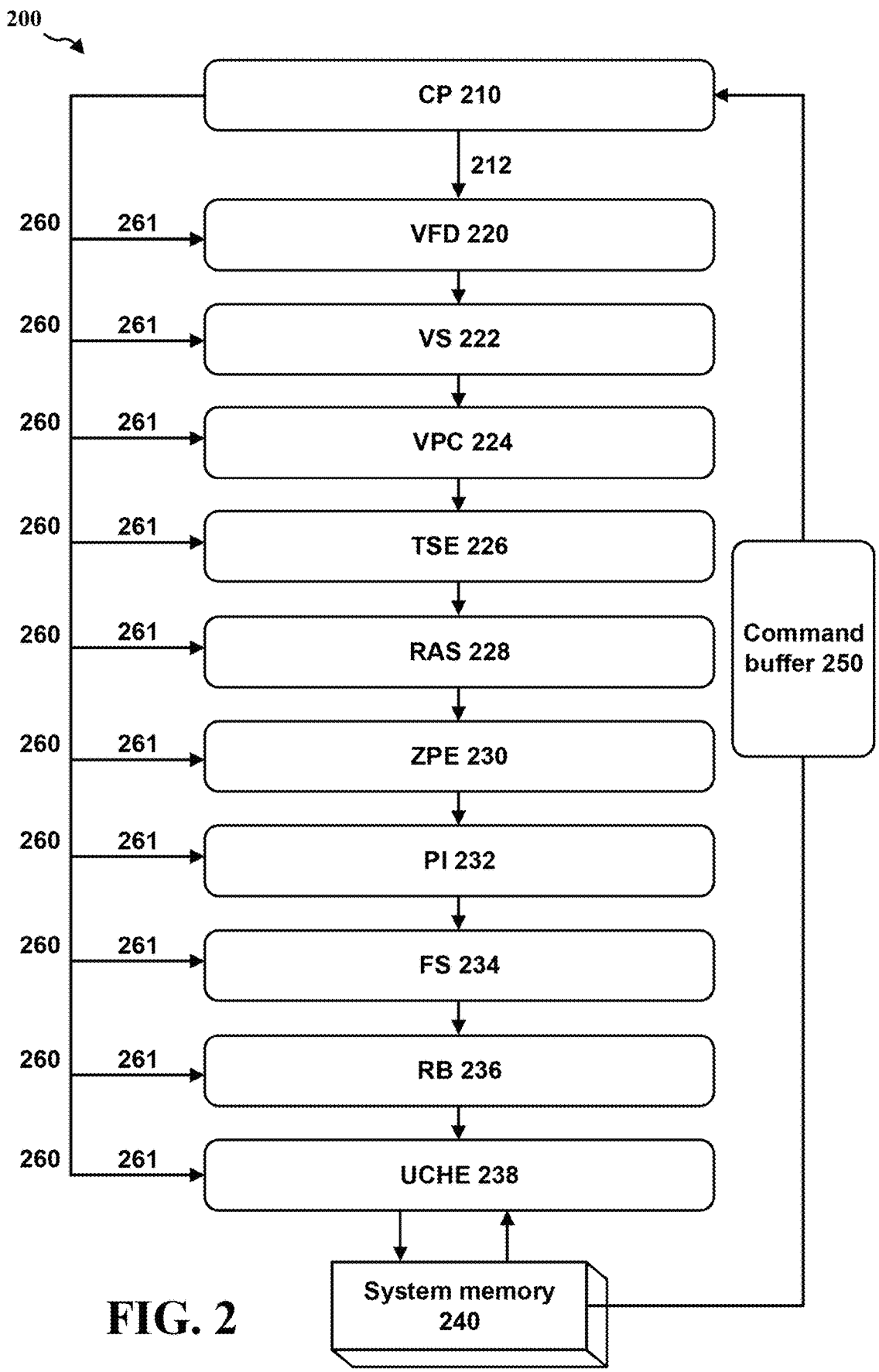
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

In some aspects, the rendering of an image or frame can be performed in multiple locations and/or on multiple devices, e.g., in order to divide the rendering workload between different devices. For example, the rendering workload can be split between a server and a client device. In some aspects, this process can be referred to as "split rendering." In some instances, split rendering can be a method for bringing content to client devices or head mounted displays (HMDs), where a portion of the computer or graphics processing can be performed outside of the client device or HMD, e.g., at a server.

Split rendering can be performed for a number of different types of applications, e.g., virtual reality (VR) applications, augmented reality (AR) applications, and/or extended reality (XR) applications. In VR applications, the content displayed at the client device can correspond to rendered or animated content, e.g., content rendered at a server or client device. In AR or XR applications, a portion of the content displayed at the client device can correspond to real-world content, e.g., objects in the real world, and a portion of the content can be rendered or animated content. Also, the rendered or animated content and real-world content can be displayed in an optical see-through or a video see-through device, such that the user can view real-world objects and rendered content simultaneously. In some aspects, XR content can refer to both VR and AR content. XR, VR, and AR applications can all involve a user viewing rendered content through a headset.

Split rendering can provide a high quality user experience in XR, AR or VR applications by splitting the computational workload between a client or user device, e.g., a head mounted display (HMD) or headset, and a server. In some aspects, the client device and the server can be connected to each other via a low-latency communication link, e.g., 5G or Wi-Fi. Also, the server can be located close to the low-latency communication link in order to reduce latency. In some aspects, the server can be referred to as an edge server or a cloud server.

In some instances of XR, VR, and AR applications, a client device or headset can include a GPU or graphics processing device, which can perform the necessary computations or graphics processing for the rendered content. Utilizing split rendering can offload a significant portion of computations or graphics processing to a server. In these instances, the server can be any device that can perform some computations or graphics processing offloaded from the client device. For example, the server can be a cloud server, an edge server, a personal computer, a smart phone, or any appropriate device.

Split rendering can distribute the rendering computations between the server and the client device in a number of different ways. For example, all of the rendering can be performed on the client device, i.e., where all of the computations are performed on the client, and the client shares the computation status with the server. Additionally, all of the rendering can be performed on the server, i.e., where all of the computations are performed on the server, even the images that are to be displayed on the client. In some aspects, in order to reduce the latency in split rendering, some client devices can stream uncompressed video to the server. However, streaming uncompressed video may need a throughput level that is available with certain types of servers.

As described above, content rendered for augmented reality (AR) may be sparse given that the virtual content may be viewed in the context of the real world. For example, in some aspects of AR, a portion of a frame, e.g., up to 50% or more, outside one or more bounding boxes of the rendered field of view may be transparent through which the real world is viewed.

In some AR use cases, the rendering may be split between a server, e.g., a phone or edge server, and a client AR device, e.g., a head set. These devices can be connected by a wire or a wireless connection. In such instances, the content may be rendered on the server, and then encoded and transmitted to the client device. The client device can then decode the content and warp it to the latest user pose, as well as display the content. Moreover, encoding and decoding an eye-buffer that corresponds to a full display resolution, e.g., including the transparent area, may typically result in significant latency and power without commensurate output. As such, there is a present need for atlases and eye-buffers in split rendering that correspond to a full display resolution that result in an optimized amount of latency and power utilized.

Aspects of the present disclosure can include atlases and eye-buffers in split rendering that correspond to a full display resolution that result in an optimized amount of latency and power utilized. In some aspects, the present disclosure can include atlas management. For instance, atlas management of the present disclosure can compact sparse AR content and reduce decode latency, as well as reduce the amount of power utilized. Aspects of the present disclosure can also reduce the amount of double data rate (DDR) bandwidth on the client side.

Figure 3:
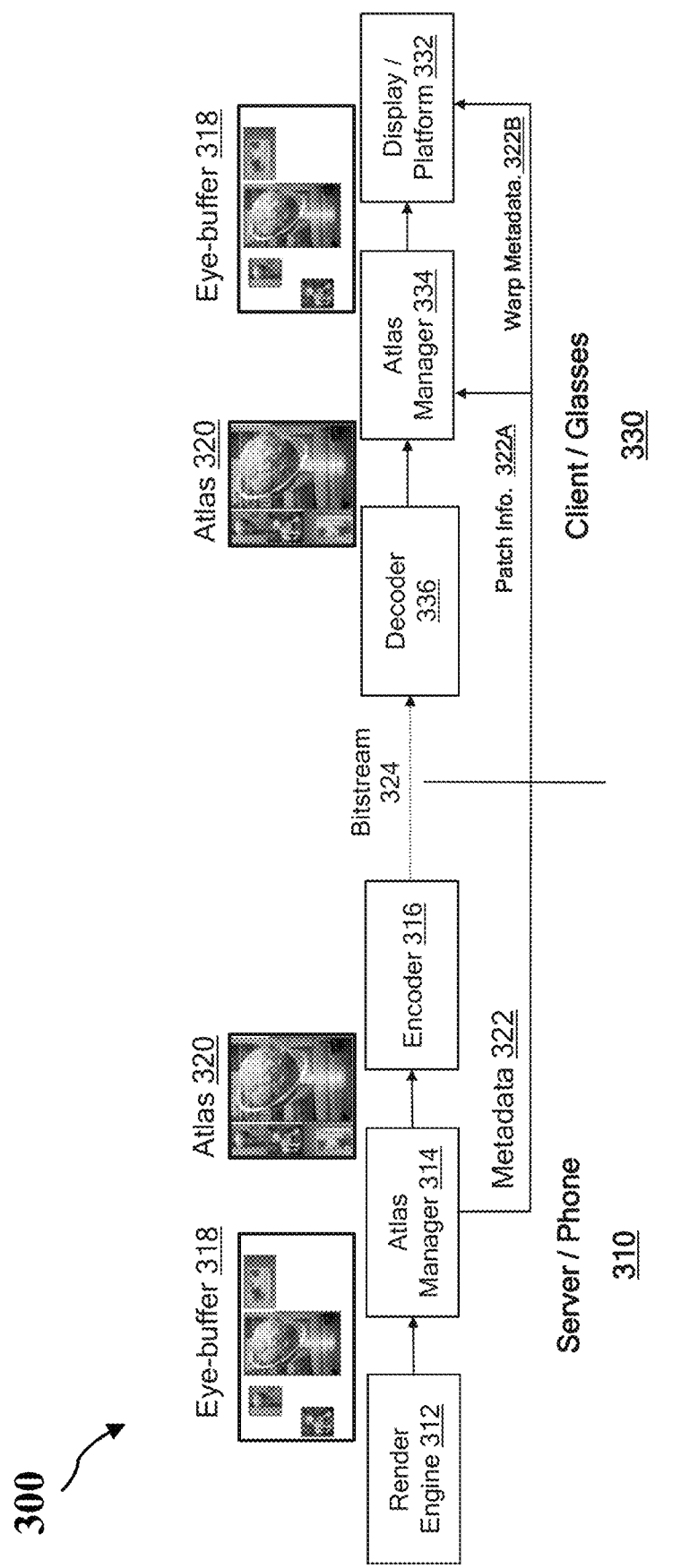
FIG. 3 illustrates an example diagram including communication between a client device and a server in accordance with one or more techniques of this disclosure.

FIG. 3 illustrates diagram 300 including communication between a client device and a server in accordance with one or more techniques of this disclosure. As shown in FIG. 3, diagram 300 includes a server or phone 310 and a client device or glasses 330. In general, the combined system 300 including the server 310 and client device 330 coordinate a split rendering of AR content as described above. Both the server side 310 and the client side 330 can be configured to generate/process an eye-buffer 318 and an atlas 320. More generally, the server 310 can perform a number of different functions, such as rendering, atlas management, and encoding. The client 330 can also perform a number of different functions, such as decoding, atlas management, and XR runtime or display. Moreover, it is generally noted that each of the server 310 and client device 330 can include one or more of content generation system 100 and/or GPU 200 to perform the functional and techniques described herein.

According to the exemplary aspect, the server 310 includes a render engine 312 that is configured to produce a sparse eye-buffer 318 that includes the active parts or components of the AR content, i.e., in other words the eye-buffer 318 does not include pixels in the frame that correspond to the transparent background of the rendered content, for example. In one aspect, the eye-buffer 318 is generated by touching (e.g., via a user interface) the rendered pixels to select the active portions of the AR content. In another aspect, the produced eye-buffer 318 includes those portions of the rendered AR content that is visible by the user apart from the field of view that is transparent through which the real world is viewed. The server 310 further includes an atlas manager 314 that is configured to collate together the eye-buffer 318 to generate a compact atlas 320. That is, the generated compact atlas contains only those portions of AR content required by the client device 330 for recreating and displaying the AR content. The remaining portions of pixels of each frame of the AR content that are not needed by the client device 330 will be excluded from the compact atlas 320 according to an aspect.

As further shown, the server 310 includes an encoder 316 that is generate configured to encode media content before transmitting the encoded content to the client device 330. In one aspect, the encoder 316 can be an H.264 or HEVC encoder for example. Thus, in the exemplary aspect, the encoder 316 receives the compact atlas 320 that is generated by the atlas manager 314 and encodes and streams (e.g., as bit stream 324) this encoded content to the client 330. In general, it is noted that encoder 316 can be implemented as content encoder/decoder 122 as described above with respect to FIG. 1, for example. Moreover, in an aspect, the bit stream 324 can be transmitted to the client device 330 using communication interface 126 as described above with respect to FIG. 1, for example.

Moreover, the atlas manager 314 is further configured to generate metadata 322 that that informs the client 330 of the mapping of locations between the rendered eye-buffer 318 and the atlas 320 having the same content, which can include patch information, for example, of the spare AR content. In other words, the metadata 322 will include patch information 322A that can be processed by the client device 330 to determine the respective positions of each active portion of the eye-buffer 318 used to generate atlas 320. Additional metadata can include warping metadata 322B, such as a head pose, depth of each active part, or three dimensional locations of the active portion, may also be sent as part of the stream. In general, the metadata 322 can be transmitted with the bit stream 324 of the encoded atlas 320 or as a separate stream to client 330.

In either event, the client 330 receives the encoded content (e.g., bit stream 324) and the metadata 322. In an aspect, the bit stream 324 can be received using communication interface 126 as described above with respect to FIG. 1, for example.

Essentially, the client 330 includes similar components as the server 310, but is configured to perform the opposite job of the server, e.g., demultiplexing the decoded atlas 320 into an eye-buffer 318 based on the received metadata. More particularly, the client 330 includes decoder 336, which can similar be an H.264 or HEVC encoder, that is configured to decode the received bit stream 324. In general, it is noted that decoder 336 can be implemented as content encoder/decoder 122 as described above with respect to FIG. 1, for example.

Moreover, an atlas manager 334 is configured to receive and process the atlas 320 to separately obtain the eye buffer

318. For example, the atlas manager 334 can be configured to use the patch information 322A to determine the respective locations of each portion of the content within atlas 320 and, in turn, reproduce eye-buffer 318. This eye-buffer 318 can then be fed to display/platform 332 (e.g., XR runtime on an AR display device, such as glasses or the like), which also uses the warp metadata 322B to produce/display the AR content, the details of which will be discussed below.

Figure 4:
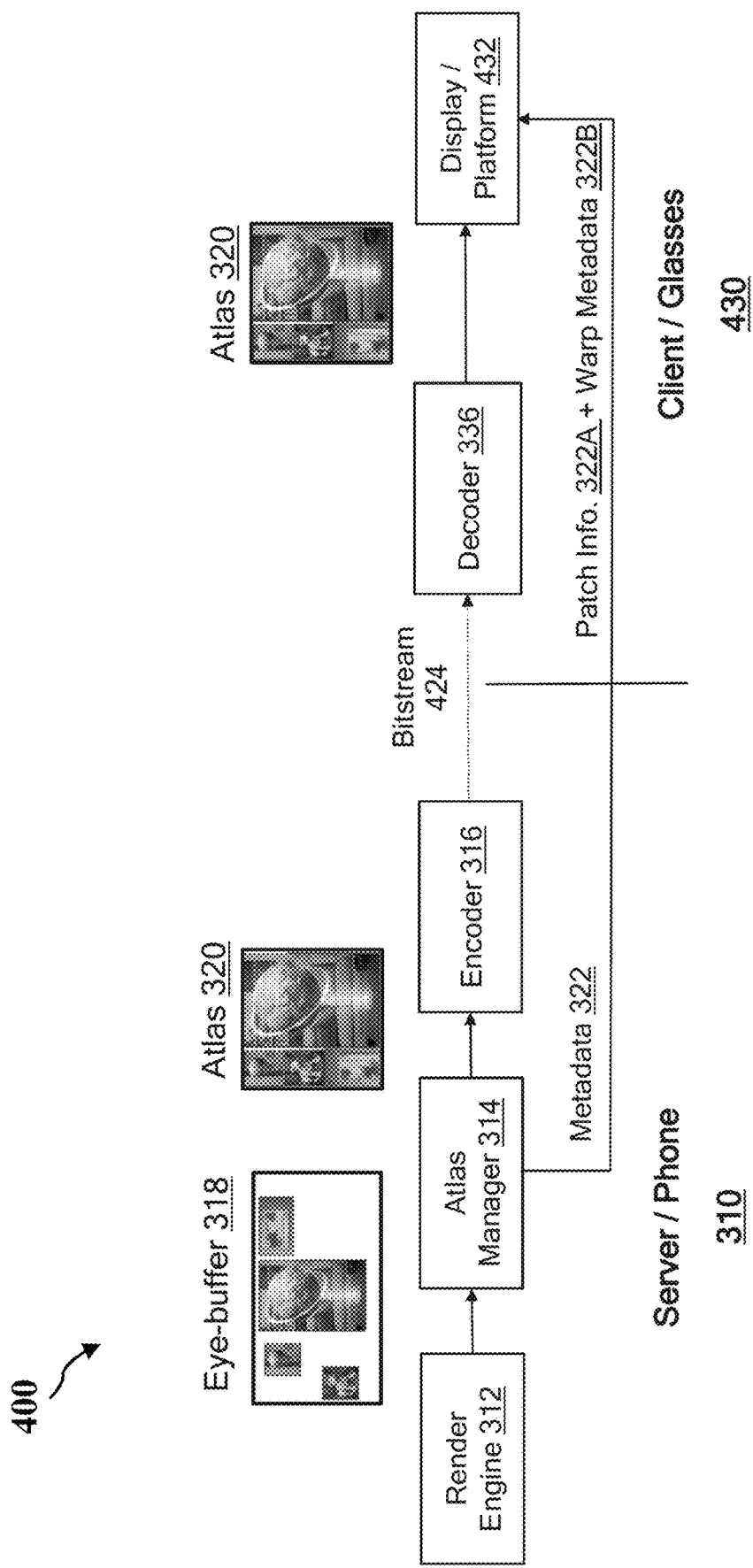
FIG. 4 illustrates an example diagram including communication between a client device and a server in accordance with one or more techniques of this disclosure.

FIG. 4 illustrates diagram 400 including communication between a client device and a server in accordance with one or more techniques of this disclosure. In general, it is noted that the diagram or system 400 as shown includes many of the same components with like numerals as described above with regard to FIG. 3, the details of which will not be repeated.

However, in this exemplary aspect, the client device 430 includes a display/platform 432 (e.g., XR runtime application) that may be designed so that it can directly accept the atlas 320 and the patch information metadata 322A along with the usual warp metadata 322B. As part of the time-warp process, the appropriate portions of the atlas 320 may be warped differently and placed into the correct area of the display. In turn, this may be guided by both the patch information metadata 322A as well as warp metadata 322B to recreate the AR content on the client device 430. Thus, in this aspect, the configurations of the atlas manager 334 as described above with respect to FIG. 3 are directly included as part of the display/platform 432 (e.g., XR runtime application) to recreate the AR content.

Figure 5:
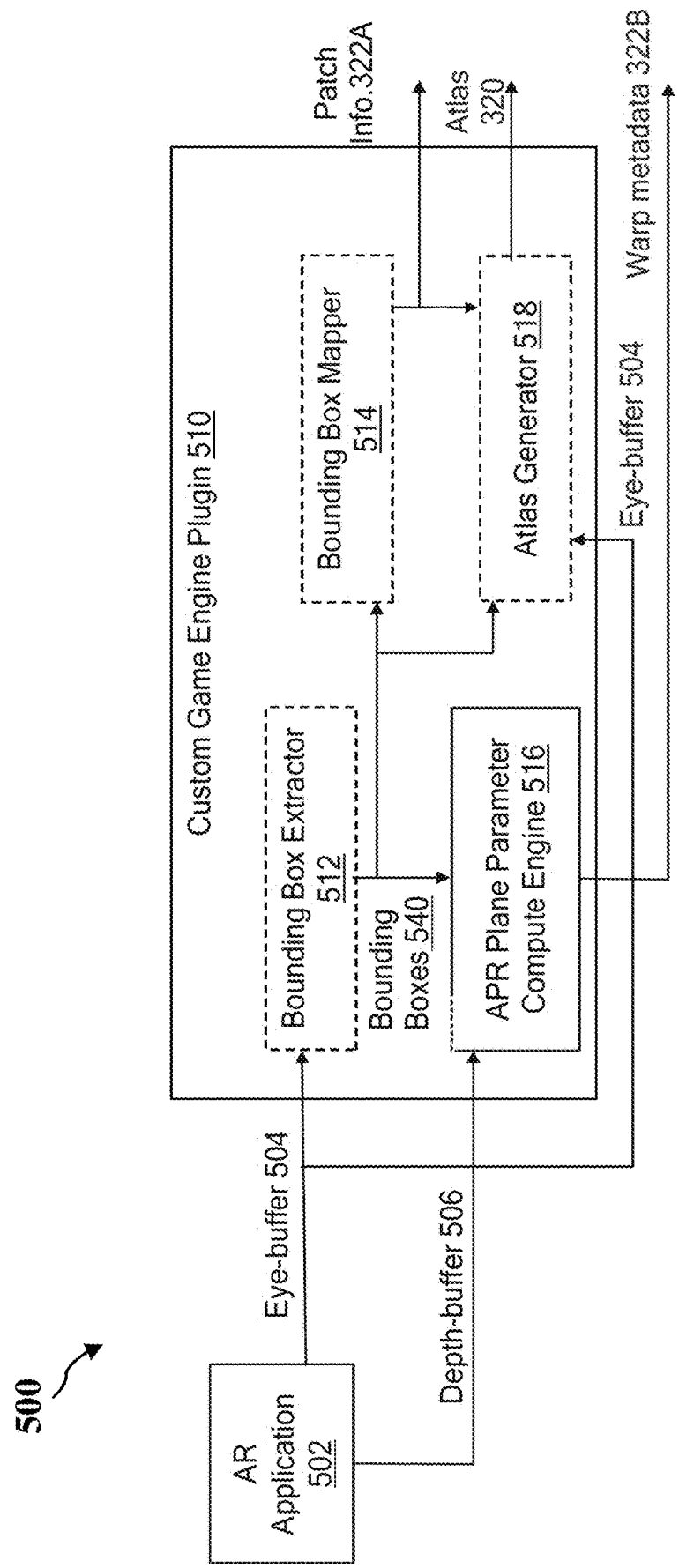
FIG. 5 illustrates an example diagram of atlas management in accordance with one or more techniques of this disclosure.

FIG. 5 illustrates diagram 500 of atlas management in accordance with one or more techniques of this disclosure. In general, diagram 500 illustrates components of server 310 as described above with respect to FIGS. 3 and 4 and, more particularly, includes components of atlas manager 314, which may include the dashed boxes as shown according to an aspect.

In an aspect, the AR application 502 can include rendered content generated by render engine 312. Moreover, an eye-buffer 504 (corresponding to eye-buffer 318, for example) and a depth-buffer 506 are provided by the AR application 502 to custom game engine plugin 510. In general, it is noted that the custom game engine plugin 510 can be an application executed by system 100 and, in particular, device 104 as described above with respect to FIG. 1, for example, in order to display sparse AR content. Moreover, the custom game engine plugin 510 may be configured to execute the functions of atlas manager 314 as described above.

In an example aspect, the custom game engine plugin 510 includes bounding box extractor 512, bounding box mapper 514, APR plane parameter compute engine 516 and atlas generator 518. In an aspect, each of bounding box extractor 512, bounding box mapper 514 and atlas generator 518 can be configured to collectively execute the functions atlas manager 314 as described above. In one aspect, these components can be executed by processing unit 120.

As shown, the rendered eye-buffer 504 is fed to bounding box extractor 512 that may be configured to analyze eye-buffer 504 to produce bounding boxes that contain the rendered virtual content in the scene. This can be based on connected component analysis to determine closed contours in the eye-buffer 504 that fully contain a rendered object. Each bounding box 540 can generally be considered a bounding perimeter for each patch of active content in the rendered AR content. It is noted that the term "bounding box" does not necessarily mean a square or rectangular box and can more generally be considered any type of perimeter that identifies the sparse AR content to be transmitted to the client device 330.

In some instance, both unity and unreal may provide application program interfaces (APIs) to query bounding boxes for actors in the scene. Thus, such closed contours can be determined by merging bounding boxes with object overlaps. The produced bounding boxes 540 may be mapped to patches on the real estate of the atlas 320 such that a tight packing into the atlas real estate may be achieved. This may include scaling the content within the bounding boxes to achieve efficient packing. Moreover, the content in the eye-buffer 504 may be extracted based on bounding box information and written into the atlas 320 based on the patch information or metadata determined previously.

Thus, as further shown, the bounding boxes 540 are fed to bounding box mapper 514 and APR plane parameter compute engine 516. The bounding box mapper 514 is configured to generate patch information 322A as described above, which provides information regarding the location and/or size of the rendered content bound in each box. The patch information 322A is provided to client device 330 as metadata as described above. Moreover, the atlas generator 518 is configured to generate the compact atlas 320 as described above using both the bounding boxes 540 and the patch information 322A based on the received eye-buffer 504. Yet further, the APR plane parameter compute engine 516 is configured to determine the warp metadata 322B (e.g., head pose, depth of each active part, and/or three dimensional locations of the active portion) of the rendered AR content in each frame based on the depth-buffer 506 and for each bounding box 540. The APR plane parameter compute engine 516 then outputs this information as warp metadata 322B, which is transmitted to client device 330 as also described above.

Figure 6:
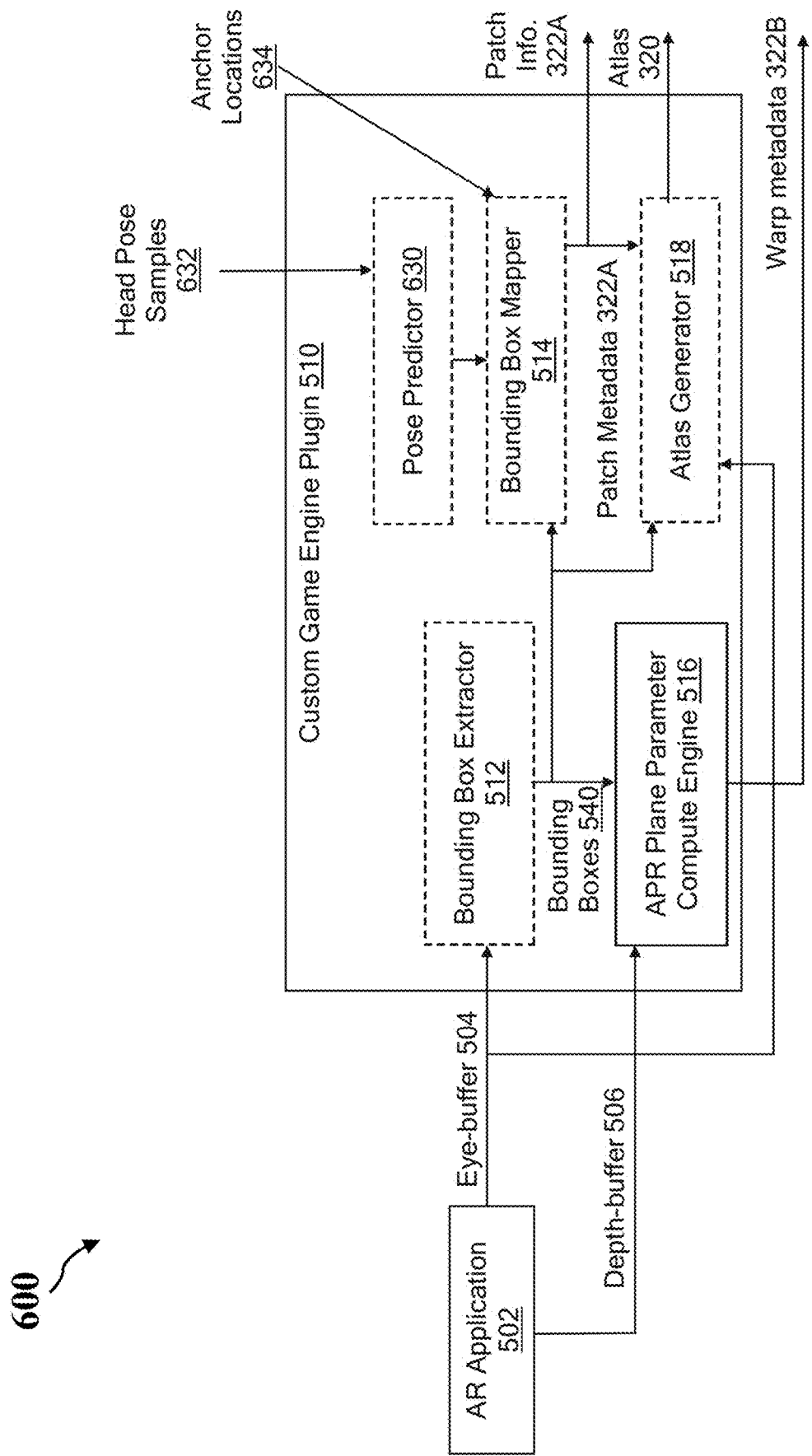
FIG. 6 illustrates an example diagram of atlas management in accordance with one or more techniques of this disclosure.

FIG. 6 illustrates diagram 600 of atlas management in accordance with one or more techniques of this disclosure. In general, it is noted that the diagram or system 600 as shown includes many of the same components identified by like numerals as described above with regard to system 500 of FIG. 5, the details of which will not be repeated. In an aspect, the system 600 is a configuration of the server 310 that is configured to generate and pack the compact atlas 320 with pose prediction of the active portions of the content.

More particularly, in some aspects, changing the dimensions of the atlas frequently may adversely affect the encoding of the atlas by the subsequent video codec. On the other hand, as the user moves, anchored content may zoom in or out in the eye-buffer, which in turn may utilize a differently sized atlas, assuming there is no change in quality. Based on past user motion, the future location of the user can be predicted over a short period of time, e.g., 10 frames or 160 ms at 60 fps. Also, given known anchor locations of the objects in the scene, the size variation in the bounding boxes 540 of the objects can be predicted based on user motion prediction. The size of the atlas 320 for the short period of time may then be fixed based on these predictions.

As shown in FIG. 6, the custom game engine plugin 510 can further include a pose predictor 630 that is configured to receive a plurality of head pose samples 632 from AR application 502 as metadata indicating positioning and/or movement of the user, for example, of the AR device (e.g., client device or glasses 330). In other words, the pose predictor is configured to receive from the client device 330 and based on these past pose samples, the pose predictor 630 may be configured to predict the future location and movement/motion of the user (e.g., poses) for the next frames of for the AR application 502, for example. Also, given known anchor locations 634 of the objects in the rendered AR scene (e.g., where in the physical world a virtual object seen in the eye buffer has been anchored to or the distance of the object from the user), the size variation in the bounding boxes 540 of the objects can be predicted based on user motion prediction from the pose predictor 130 and position of the object from the known anchor locations. Accordingly, when allocating real estate in the atlas 320 for that object of the eye-buffer 504, the custom game engine plugin 510 is configured to use the maximum size of the object in the user's perspective estimated over the next few frames. In an aspect, this allocation of real estate is held constant over those next few frames. Moreover, in some of those frames, the entire real estate allocated to the object may not be used (e.g., the object is smaller in perspective), and in some frames it gets fully used, for example.

In some additional aspects, a focus of a system where video data is sent over a shared wireless link, e.g., a 5G air link, may be the tradeoff between users and bit-rate or quality. Depending on the available user throughput, e.g., due to congestion or location of user and its impact on the link, the encoding bit-rate may be set.

In some instances, the target bit-rate may be provided as an additional input when determining the patch metadata 322A, so that the content in the eye-buffer 318 can be scaled to aid the encoder 316 in rate-control. Aspects of the present disclosure can assign a global scaling factor $\alpha$ and for each bounding box k and a per-layer scale factor $s_k$. The per-box scale factor may depend on the distance of the content in the box from the user location, perceptual importance, or location in the eye-buffer 318, where it may be relative to the fovea, or content complexity. Given the variance $\sigma_k^2$ of a layer, the present disclosure can assume a rate per layer of $R=\beta \log(\sigma_k^2/D)$, where $\beta$ is a tunable constant. Aspects of the present disclosure can also solve for $\alpha$, such that $\Sigma(\alpha^2 s_k^2 h_k w_k R_k) \leq R_{target}$, so that D is minimal. Also, the present disclosure may keep $\alpha s_k$ unchanged over a short temporal sequence of frames, e.g., group of pictures (GOP). Based on the range of positions predicted for the user, the present disclosure can determine an average $s_k$ for that period of time.

Figure 7:
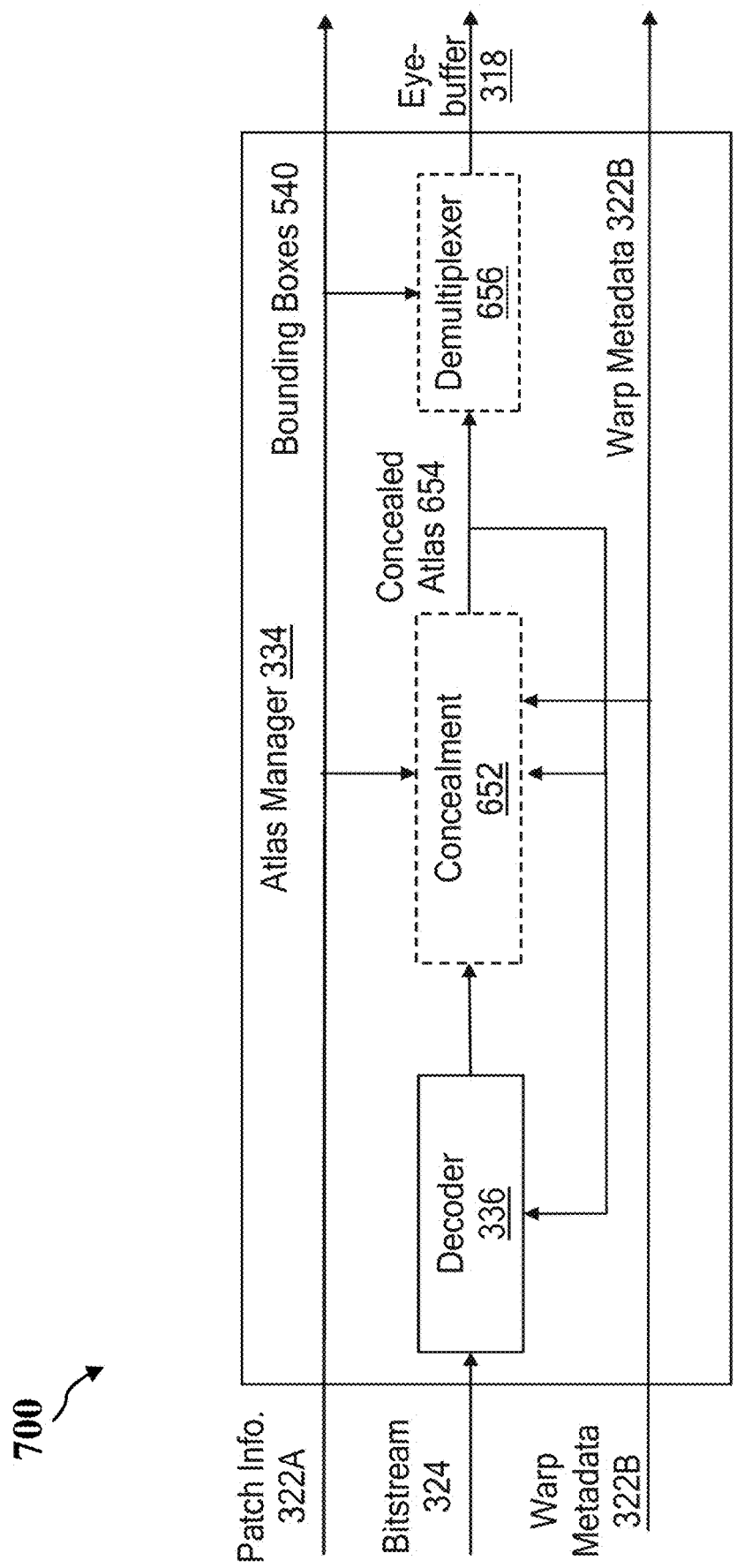
FIG. 7 illustrates an example diagram of atlas management in accordance with one or more techniques of this disclosure.

FIG. 7 illustrates diagram 700 of atlas management in accordance with one or more techniques of this disclosure. In general, diagram 700 illustrates component of client device 330 as described above with respect to FIGS. 3 and 4 and, more particularly, includes components of atlas manager 334, which may include the dashed boxes as shown according to an aspect.

As described above, on the client side 330, the decoder 336 may receive the atlas bit stream 324 and decode it into the atlas pixel buffer. If there are packet losses, this can include concealment of patches in the current decoded atlas 320 using information from corresponding patches in the previous atlas frame. According to an aspect, patch correspondence between consecutive atlas frames may be maintained. New patches or bounding boxes may be explicitly marked in the metadata. Also, concealment can account for the effect of user orientation change on the object appearance in the eye-buffer. The concealed frame may then be used as a reference for decoding the next atlas 320 received from server 310. The current patch information (e.g., patch metadata 322A) may then be used to demultiplex the atlas 320 into the eye-buffer 318.

Thus, as shown in FIG. 7, diagram 700 provides for atlas management in accordance with one or more techniques of this disclosure. In particular, diagram 700 includes a number of different components, such as an atlas manager 334 at a client 330, which can include a decoder 336, a concealment component 752, and an atlas demultiplexer 756. The atlas manager 334 receives patch information 322A, warp metadata 322B and the bit stream 324 of the compressed atlas from server 310 as described above. The decoder 336 decodes the bit stream 324 as also described above and provides the compact atlas 320 of the AR content to concealment component 752, which also receives the patch metadata 322A and the warp metadata 322B.

As noted above, when there are packet losses in the bit stream 324, for example, the concealment component 752 is configured to conceal these patches in the current decoded atlas 320 using information from corresponding patches in a previous atlas frame, for example. Thus, according to an aspect, patch correspondence between consecutive atlas frames may be maintained. The concealed atlas 754 is then provided to the demultiplexer 756, which is configured to recreate the eye-buffer 318 using the bounding boxes 540 as also described above. That is, the demultiplexer 756 receives the position and sizing information (e.g., from patch metadata 322A) for each patch in the atlas 320 and is configured to recreate the eye-buffer 318 with the patches correctly placed and sized using this patch metadata 322A.

In some aspects, writing into the atlas 320 may involve touching the rendered pixels, and may be a point where other pixel modifications can be affected. Also, color-space transformations can be performed as part of the atlas writing operation by atlas manager 314, for example. Foveated compression of the content may be another operation that can be folded into the atlas writing operation. Additional metadata may be generated to indicate how foveated decompression is applied on each bounding box on the client side. The operation of atlas management at the server 310 and client 330 may be subsumed into an AR encoder or decoder an exemplary aspects.

Moreover, there may be multiple atlases 320 sent from the server 310 to the client 330 on a real-time or periodic basis, for example. For instance, each atlas 320 may contain data that is updated at a specific frame rate. For example, where the background AR scene is updated at a lower rate than the foreground, the foreground objects may be sent as a separate atlas 320. Additionally, when some patches in the same atlas are updated less frequently compared to other patches, the codec may be able to handle the temporal redundancy in the patches that were not updated.

Aspects of the present disclosure can include a method of spatially packing sparse content in an AR eye-buffer 318 into an atlas 320 using bounding box metadata as described above. The present disclosure can also de-pack this content at the client AR device 330 prior to display by display/platform 322. In some instances, where there is no explicit de-packing of the atlas and is implicit in the time-warp operation at the client, this operation may be guided by patch information and warping metadata. Additionally, the present disclosure can determine the patch information metadata 322A so that the size of each patch is consistent over a period of time without a substantial change in quality of the content, such as by using user pose prediction.

The present disclosure can also determine the patch information metadata 322A so that a target bit-rate is met, which can be aided by pose prediction for the user and object locations within the scene. The present disclosure can also combine color space transformation and foveated compression with the atlas manager. Moreover, the present disclosure may include a hardware encoder or decoder module that combines traditional compression and atlas management into a single operation. Also, aspects of the present disclosure may generate the eye-buffer on the client with packet loss concealment driven by the patch metadata.

Figure 8:
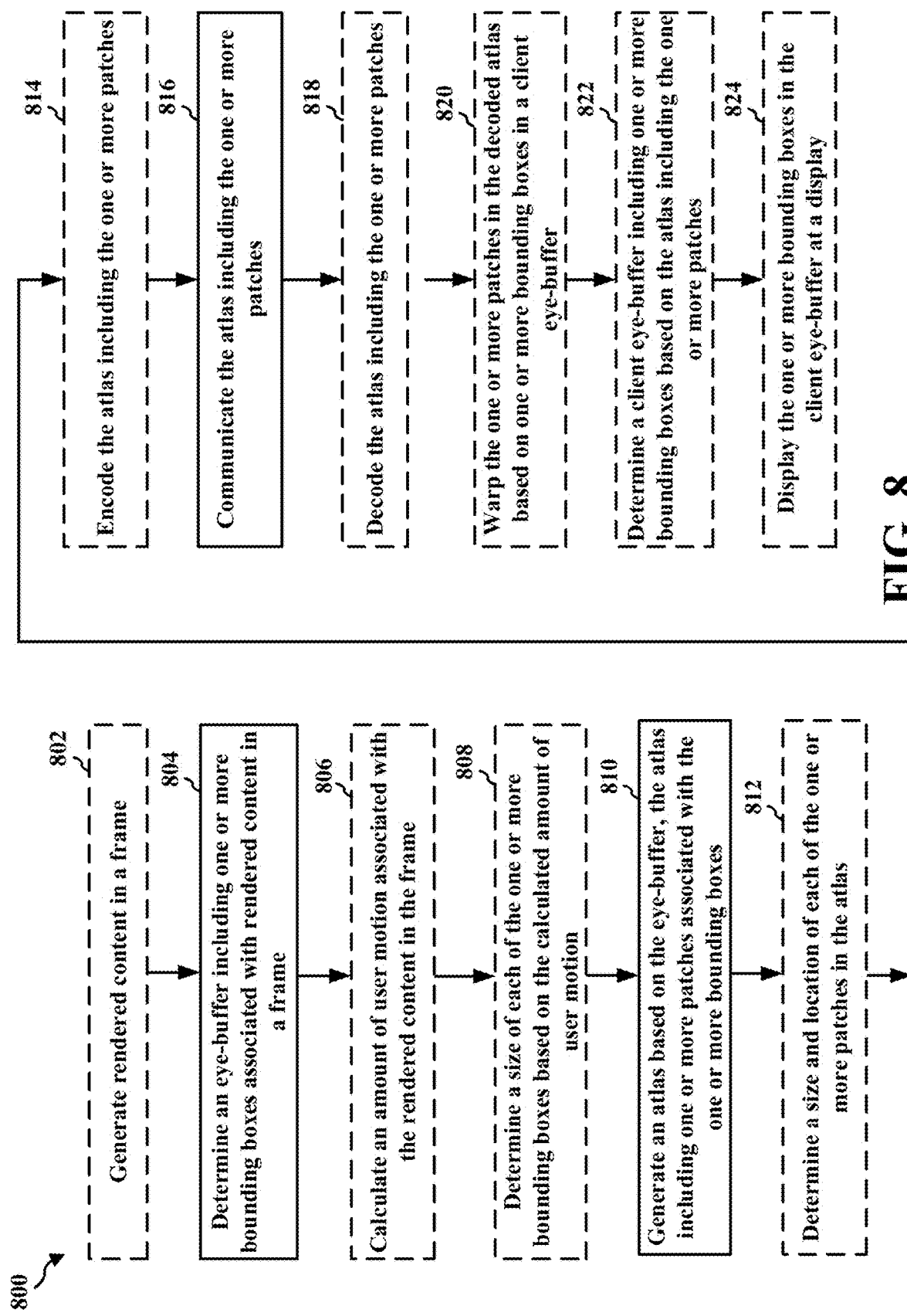
FIG. 8 illustrates an example flowchart of an example method in accordance with one or more techniques of this disclosure.

FIG. 8 illustrates an example flowchart 800 of an example method in accordance with one or more techniques of this disclosure. The method may be performed by an apparatus such as a server, a client device, a CPU, a GPU, or an apparatus for computer or graphics processing. In one aspect, the method may be performed by server/phone 310 and client/glass 330, including one or more components, as described above.

At 802, the apparatus may generate rendered content in the frame, for example, by rendered engine 312. At 804, the apparatus may determine an eye-buffer 318 including one or more bounding boxes 540 associated with rendered content in a frame, as also described above. In some aspects, the one or more bounding boxes 540 may include information regarding the rendered content in the frame.

At 806, the apparatus may calculate an amount of user motion associated with the rendered content in the frame. At 808, the apparatus may determine a size of each of the one or more bounding boxes based on the calculated amount of user motion. In some aspects, the size of each of the one or more patches may correspond to a size of each of the one or more bounding boxes 540. Also, the size of each of the one or more patches may be determined based on a target bit-rate in one aspect.

At 810, the apparatus may generate an atlas 320 based on the eye-buffer 318, where the atlas 320 can include one or more patches associated with the one or more bounding boxes 540. In some aspects, each of the one or more patches may be associated with patch metadata 322A.

At 812, the apparatus may determine a size and location of each of the one or more patches in the atlas 320. At 814, the apparatus may encode (e.g., using encoder 316) the atlas 320 including the one or more patches. At 816, the apparatus may communicate the atlas 320 (e.g., as a bit stream 324) including the one or more patches.

At 816, the apparatus may also transmit, to a client device 330, the atlas 320. At 816, the apparatus (e.g., client device 330) may receive, from a server (e.g., client device 310), the atlas 320 including the one or more patches. At 818, the apparatus may decode (e.g., by decoder 336) the atlas 320 including the one or more patches.

At 820, the apparatus may warp the one or more patches in the decoded atlas 320 based on one or more bounding boxes 540 to recreate the client eye-buffer 318. At 822, the apparatus (e.g., client device 330) may determine the client eye-buffer 318 including one or more bounding boxes 540 based on the atlas 320 including the one or more patches. At 824, the apparatus may display (e.g., on display/platform 332) the one or more bounding boxes in the client eye-buffer 318, where the one or more bounding boxes may be associated with the rendered content in the frame.

In one configuration, a method or apparatus for graphics processing is provided. As described above, the apparatus may be a server, a client device, a CPU, a GPU, or some other processor that can perform computer or graphics processing. In one aspect, the apparatus may be the processing unit 120 within the device 104, or may be some other hardware within device 104 or another device. The apparatus may include means for determining an eye-buffer including one or more bounding boxes associated with rendered content in a frame. The apparatus may also include means for generating an atlas based on the eye-buffer, the atlas including one or more patches associated with the one or more bounding boxes. The apparatus may also include means for communicating the atlas including the one or more patches. The apparatus may also include means for calculating an amount of user motion associated with the rendered content in the frame. The apparatus may also include means for determining a size of each of the one or more bounding boxes based on the calculated amount of user motion. The apparatus may also include means for determining a size and location of each of the one or more patches in the atlas. The apparatus may also include means for encoding the atlas including the one or more patches. The apparatus may also include means for sending, to a client device, the atlas including the one or more patches. The apparatus may also include means for receiving, from a server, the atlas including the one or more patches. The apparatus may also include means for decoding the atlas including the one or more patches. The apparatus may also include means for warping the one or more patches in the decoded atlas based on one or more bounding boxes in a client eye-buffer. The apparatus may also include means for determining a client eye-buffer including one or more bounding boxes based on the atlas including the one or more patches. The apparatus may also include means for displaying the one or more bounding boxes in the client eye-buffer at a display, where the one or more bounding boxes are associated with the rendered content in the frame. The apparatus may also include means for generating the rendered content in the frame.

The subject matter described herein can be implemented to realize one or more benefits or advantages. For instance, the described graphics processing techniques can be used by a server, a client, a GPU, a CPU, or some other processor that can perform computer or graphics processing to implement the split rendering techniques described herein. This can also be accomplished at a low cost compared to other computer or graphics processing techniques. Moreover, the computer or graphics processing techniques herein can improve or speed up data processing or execution. Further, the computer or graphics processing techniques herein can improve resource or data utilization and/or resource efficiency. Additionally, aspects of the present disclosure can utilize a split rendering process that can reduce the amount of latency and/or power utilized and maintain a high level of quality.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing augmented reality (AR) content, the method comprising:
   receiving, by a client device, an AR content atlas of AR content patches, the patches associated with bounding boxes that define sparse AR content of a frame;
   determining a location, among the bounding boxes, of each of the patches of the received atlas;
   determining an eye-buffer that includes the bounding boxes associated with the sparse AR content based on the patches and the determined location of each of the patches; and
   rendering, by the client device, the AR content based on the sparse AR content eye-buffer.

2. The method of claim 1, wherein a size of each of the bounding boxes is defined based on a calculated amount of user motion associated with the rendered AR content in the frame.

3. The method of claim 1, further comprising determining a size of each of the patches in the atlas that corresponds to a size of each of the bounding boxes.

4. The method of claim 1, wherein determining the location of each of the patches of the received atlas is based on patch metadata received from a server that generates the atlas.

5. The method of claim 1, further comprising:
   receiving warping metadata associated with the patches in the atlas;
   wherein rendering, by the client device, the AR content is further based on the warping metadata.

6. The method of claim 1, further comprising:
   transmitting, to a server, at least one head pose sample of a user of the client device that indicates at least one a positioning and movement of the user; and
   receiving, from the server, the atlas that includes the patches associated with the bounding boxes that each have a respective size that is defined based on the at least one head pose sample of the user.

7. The method of claim 1, further comprising:
   determining, by the client device, a patch correspondence between the frame and a previous frame of the AR content;
   concealing at least one patch of the received atlas based on the determined patch correspondence; and
   rendering, by the client device, the AR content based on the eye-buffer to include the sparse AR content to include the concealed at least one patch.

8. The method of claim 1, further comprising:
   receiving, by a client device, the atlas in a compressed format; and
   decoding, by a decoder of the client device, the atlas to determine the patches associated with bounding boxes that define sparse AR content of the frame.

9. A client device apparatus for processing augmented reality (AR) content, the apparatus comprising:
   a memory; and
   at least one processor coupled to the memory and configured to:
      receive an AR content atlas of AR content patches, the patches associated with bounding boxes that define sparse AR content of a frame;
      determine a location, among the bounding boxes, of each of the patches in the received atlas;
      determine an eye-buffer that includes the bounding boxes associated with the sparse AR content based on the patches and the determined location of each of the patches; and
      render the AR content based on the sparse AR content eye-buffer.

10. The apparatus of claim 9, wherein a size of each of the bounding boxes is defined based on a calculated amount of user motion associated with the rendered AR content in the frame.

11. The apparatus of claim 9, wherein the at least one processor is further configured to determine a size of each of the patches in the atlas that corresponds to a size of each of the bounding boxes.

12. The apparatus of claim 9, wherein determining the location of each of the patches in the received atlas is based on patch metadata received from a server that generates the atlas.

13. The apparatus of claim 9, wherein the at least one processor is further configured to receive warping metadata associated with the patches in the atlas and to render the AR content based on the warping metadata.

14. The apparatus of claim 9, wherein the at least one processor is further configured to:
   transmit, to a server, at least one head pose sample of a user of the client device that indicates at least one a positioning and movement of the user; and
   receive, from the server, the atlas that includes the patches associated with the bounding boxes that each have a respective size that is defined based on the at least one head pose sample of the user.

15. The apparatus of claim 9, wherein the at least one processor is further configured to:
   determine a patch correspondence between the frame and a previous frame of the AR content;
   conceal at least one patch of the received atlas based on the determined patch correspondence; and
   render the AR content based on the eye-buffer to include the sparse AR content to include the concealed at least one patch.

16. The apparatus of claim 9, further comprising a decoder configured to receive the atlas in a compressed format and decode the atlas to determine the patches associated with bounding boxes that define sparse AR content of the frame.

17. A method of processing augmented reality (AR) content, the method comprising:
   determining a sparse AR content eye-buffer that includes bounding boxes of sparse AR content of a frame;
   generating a sparse AR content atlas of the sparse AR content, the sparse AR content atlas comprising AR content patches associated with the bounding boxes;
   determining a location among the bounding boxes of each patch in the atlas; and
   transmitting the atlas and the determined locations to a client device for rendering the AR content thereon based on the atlas and the determined locations.

18. The method of claim 17, further comprising determining a size of each of the patches in the atlas that corresponds to a size of each of the bounding boxes.

19. The method of claim 18, further comprising determining the size of each of the patches based on a target-bit rate for transmitting the atlas to the client device.

20. The method of claim 17, further comprising:
   determining an amount of user motion associated with the rendered AR content in the frame; and
   determining a size of each of the bounding boxes based on the determined amount of user motion.

21. The method of claim 17, further comprising generating warping metadata associated with the patches in the atlas, such that the client device is configured to render the AR content based on the warping metadata.

22. The method of claim 17, further comprising:
   receiving, from the client device, at least one head pose sample of a user of the client device that indicates at least one of a positioning and movement of the user; and
   determining, based on the at least one head pose sample of the user, a respective size of the bounding boxes associated with the one or more patches of the atlas.

23. The method of claim 17, further comprising:
   encoding the atlas in a compressed format; and
   transmitting the encoded atlas to the client device.

24. An apparatus for processing augmented reality (AR) content, the apparatus comprising:
   a memory; and
   at least one processor coupled to the memory and configured to:
      determine a sparse AR content eye-buffer that includes bounding boxes of sparse AR content of a frame;
      generate a sparse AR content atlas of the sparse AR content, the sparse AR content atlas comprising AR content patches associated with the bounding boxes;
      determine location among the bounding boxes of each patch in the atlas; and
      transmit the atlas and the determined locations to a client device for rendering the AR content thereon based on the atlas and the determined locations.

25. The apparatus of claim 24, wherein the at least one processor is further configured to determine a size of each of the patches in the atlas that corresponds to a size of each of the bounding boxes.

26. The apparatus of claim 25, wherein the at least one processor is further configured to determine the size of each of the patches based on a target-bit rate for transmitting the atlas to the client device.

27. The apparatus of claim 24, wherein the at least one processor is further configured to:
   determine an amount of user motion associated with the rendered AR content in the frame; and
   determine a size of each of the bounding boxes based on the determined amount of user motion.

28. The apparatus of claim 24, wherein the at least one processor is further configured to generate warping metadata associated with the patches in the atlas, such that the client device is configured to render the AR content based on the warping metadata.

29. The apparatus of claim 24, wherein the at least one processor is further configured to:
   receive, from the client device, at least one head pose sample of a user of the client device that indicates at least one of a positioning and movement of the user; and
   determine, based on the at least one head pose sample of the user, a respective size of the bounding boxes associated with the one or more patches of the atlas.

30. The apparatus of claim 24, further comprising an encoder configured to encode the atlas in a compressed format, and transmit the encoded atlas to the client device.

* * * * *